(12) United States Patent
Harrison et al.

(10) Patent No.: US 11,220,206 B1
(45) Date of Patent: Jan. 11, 2022

(54) UNIT LOAD DEVICE LOCK GAP SHIM DEVICE

(71) Applicant: Amazon Technologies, Inc., Seattle, WA (US)

(72) Inventors: Samuel F. Harrison, Lynnwood, WA (US); Sivan Almosnino, Snoqualmie, WA (US); Kevin Mei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 16/664,267

(22) Filed: Oct. 25, 2019

(51) Int. Cl.
*B60P 7/15* (2006.01)

(52) U.S. Cl.
CPC .................................... *B60P 7/15* (2013.01)

(58) Field of Classification Search
CPC .. B60P 7/0892; B60P 7/14; B60P 3/40; B60P 7/13; B60P 7/135; B60P 7/0807; B60P 3/077; B60P 7/0815; B60P 7/0884; B60P 7/12
USPC .. 410/94, 121, 69, 80, 129, 90, 91, 153, 77, 410/102, 35, 46, 99; 280/785, 656, 487, 280/143, 144, 145, 146, 148, 400, 401
See application file for complete search history.

(56) References Cited

U.S. PATENT DOCUMENTS

| | | | | |
|---|---|---|---|---|
| 7,530,774 B2* | 5/2009 | Roberts | ................. | B60P 7/0892 410/69 |
| 8,057,141 B2* | 11/2011 | Bernhardsson | ......... | B60R 11/00 410/94 |
| 8,858,137 B2* | 10/2014 | Aro | ........................... | B60R 7/02 410/94 |
| 2005/0008443 A1* | 1/2005 | Eitzenberger | ............. | B60P 7/13 410/94 |
| 2008/0166199 A1* | 7/2008 | Halliar | ...................... | B60P 7/14 410/94 |

* cited by examiner

*Primary Examiner* — D Glenn Dayoan
*Assistant Examiner* — Sunsurraye Westbrook
(74) *Attorney, Agent, or Firm* — Thomas | Horstemeyer, LLP.; Jason M. Perilla

(57) ABSTRACT

A shim device and system for securing a unit load device (ULD) using the shim device are described. In one example, the system includes a pop-up lock in a deck for transporting a ULD. The system also includes the shim device, which can be placed between the ULD and the pop-up lock. The shim device provides a mechanical interference as a wedge, occupying any limited space that might exist between the bottom edge of the ULD and the pop-up lock. Thus, the shim device can prevent the ULD from moving by occupying the limited space between the ULD and the pop-up lock. In one example, the shim device includes a shim block having top, bottom, and side surfaces, an inner aperture that extends through the shim block, and a handle connected with and extending from the shim block.

20 Claims, 10 Drawing Sheets

UNIT LOAD DEVICE LOCK GAP SHIM DEVICE

BACKGROUND

The term unit load device (ULD) can refer to a number of different types or styles of containers, pallets, cans, pods, or other means of supporting and containing freight. ULDs are commonly used to load various types of freight, of any type, onto aircraft, but ULDs are also used to move items in warehouses and for other related purposes. ULDs can be relied upon to support and contain a significant amount of goods into a single unit. ULDs are easier to move than individual boxes, for example, and save time in loading and unloading. Each ULD can have its own packing list, and the contents of each ULD can be tracked more easily than individual boxes.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

As noted above, unit load devices (ULDs) are commonly used to transport and load items, such as packages, luggage, and other freight. ULDs can be used to load items onto aircraft, but ULDs can also be used to move items between different locations in warehouses. ULDs are easier to move than individual boxes, for example, and save time in loading and unloading. Each ULD can have its own packing list, and the contents of each ULD can be tracked more easily than individual boxes.

Materials handling facilities can rely on rack systems, mezzanines, conveyor systems, decking systems, and other types of equipment and fixtures for the storage and transportation of items to various locations in the facilities. A number of variations of those fixtures are commercially available to fit a number of different needs in materials handling facilities. A number of different decking systems are available, for example, including roller decking, ball decking, caster decking, and other types of decking.

Decking systems are particularly helpful for moving relatively large and heavy items, objects, pallets, ULDs, and other containers among different locations in materials handling facilities. Individuals wearing flexible-soled shoes can typically walk and maintain traction on decking. At the same time, the individuals can push or pull the heavy items or containers over the decking. The heavy items or containers will roll upon the rollers, balls, casters, or other moving parts built into the decking, to permit the items or containers to be easily moved over the decking.

It can be useful, in many cases, to maintain containers at a certain position over decking for loading, unloading, and other purposes. Decking can include means to restrain the movement of items, such as through the use of mechanical interferences. ULDs, for example, can be maintained or sequestered in place using a number of pop-up locks incorporated into the decking.

Figure 1:
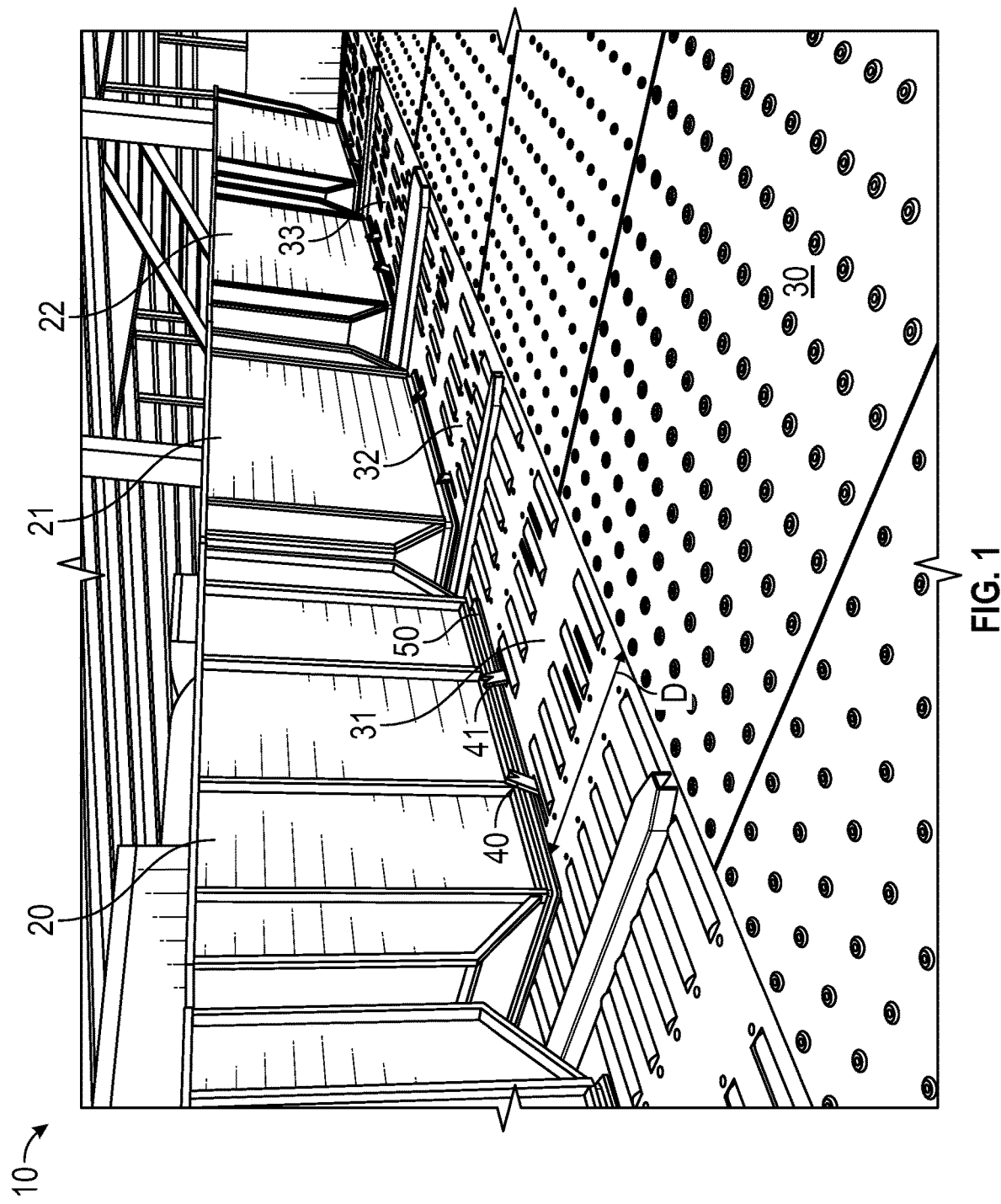
FIG. 1 illustrates a materials handling facility with unit load devices (ULDs) locked in place on decking using pop-up locks according to various aspects of the embodiments of the present disclosure.

For an example of the use of pop-up locks, FIG. 1 illustrates a materials handling facility 10 with ULDs 20-22 maintained in place on decking using pop-up locks. The materials handling facility 10 includes a number of different types of decking and decking areas, including ball decking 30 and areas of roller decking 31-33. Each of the ULDs 20-22 can be pushed over the ball decking 30 relatively easily by individuals standing on the ball decking 30. The ULDs 20-22 can be easily moved and rotated in any direction on the ball decking 30 based on the forces applied to the exterior surfaces of the ULDs 20-22. Thus, the ULDs 20-22 can be moved into position over the areas of the roller decking 31-33, respectively. While the ball decking 30 is designed to facilitate the free movement of the ULDs 20-22 in any direction, the areas of roller decking 31-33 are designed to permit movement in one direction. For example, the roller decking 31 is designed to permit movement in the direction "D," as shown in FIG. 1, and the roller decking 32 and 33 also permits movement in one direction. In any case, the ULDs 20-22 will rest on the balls of the ball decking 30 and the rollers of the roller decking 31-33 at a height of about 1 inch above the surface of the ball decking 30 and the roller decking 31-33.

Figure 2A:
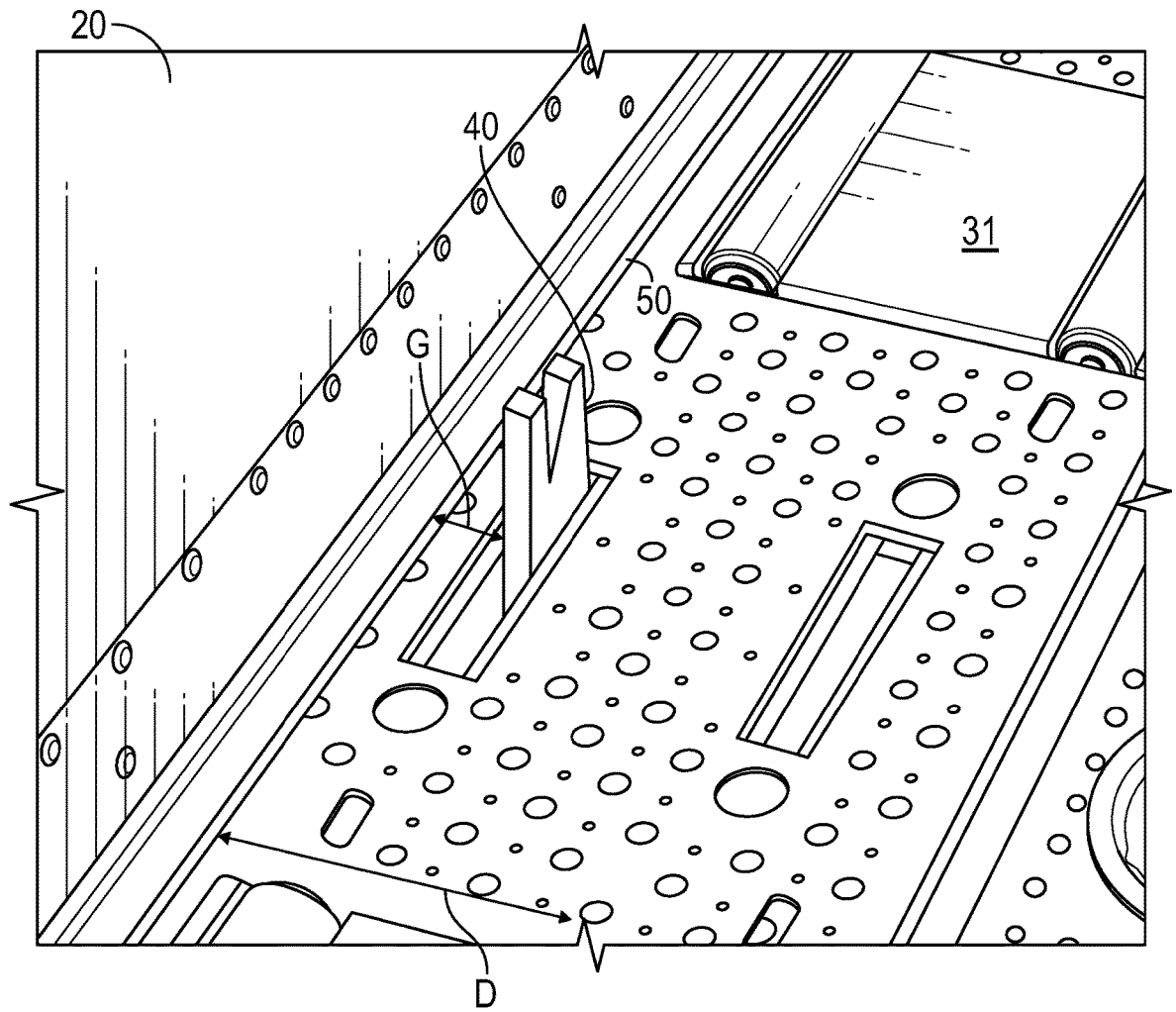
FIG. 2A illustrates a closer view of a pop-up lock and ULD according to various aspects of the embodiments of the present disclosure.

The areas of the roller decking 31-33 are limited in space to about the same size as the base or bottom of the ULDs 20-22. Once pushed onto the areas of the roller decking 31-33, the ULDs 20-22 can be maintained or sequestered in place using pop-up locks. As one particular example illustrated in FIG. 1, the pop-up locks 40 and 41 have each been rotated out from within slots or openings in the roller decking 31 and extend up from the top surface of the roller decking 31. An enlarged view of the pop-up lock 40 is shown in FIG. 2A and described in greater detail below. The pop-up locks 40 and 41 provide a mechanical interference against the bottom edge 50 of the base of the ULD 20, to prevent the ULD 20 from rolling in the direction "D" back onto the ball decking 30.

Various types of pop-up locks, similar to the pop-up locks 40 and 41, are known and used in different types of decking for a number of purposes. For example, pop-up locks can be used in the decking on aircraft, to separate ULDs and prevent them from knocking into each other during loading, unloading, and transport. Thus, pop-up locks can be relied upon to solve a number of practical and safety concerns. In the example shown in FIG. 1, the pop-up locks 40 and 41 can be helpful to sequester the ULD 20 in place on the roller decking 31 when the ULD 20 is being loaded or unloaded, for example, in the materials handling facility 10.

However, ULDs are generally manufactured without particularly strict manufacturing tolerances. The dimensions of the base of the ULD 20 can vary as compared to the ULDs 21 and 22 by between ½ and 1½ inches, for example, in length, width, or both length and width. As such, although the pop-up locks 40 and 41 can be relied upon to generally maintain the ULD 20 in place on the roller decking 31, the ULD 20 can still shift to some extent due to a gap or opening that still exists between the bottom edge 50 of the base of the ULD 20 and the pop-up locks 40 and 41.

Figure 2B:
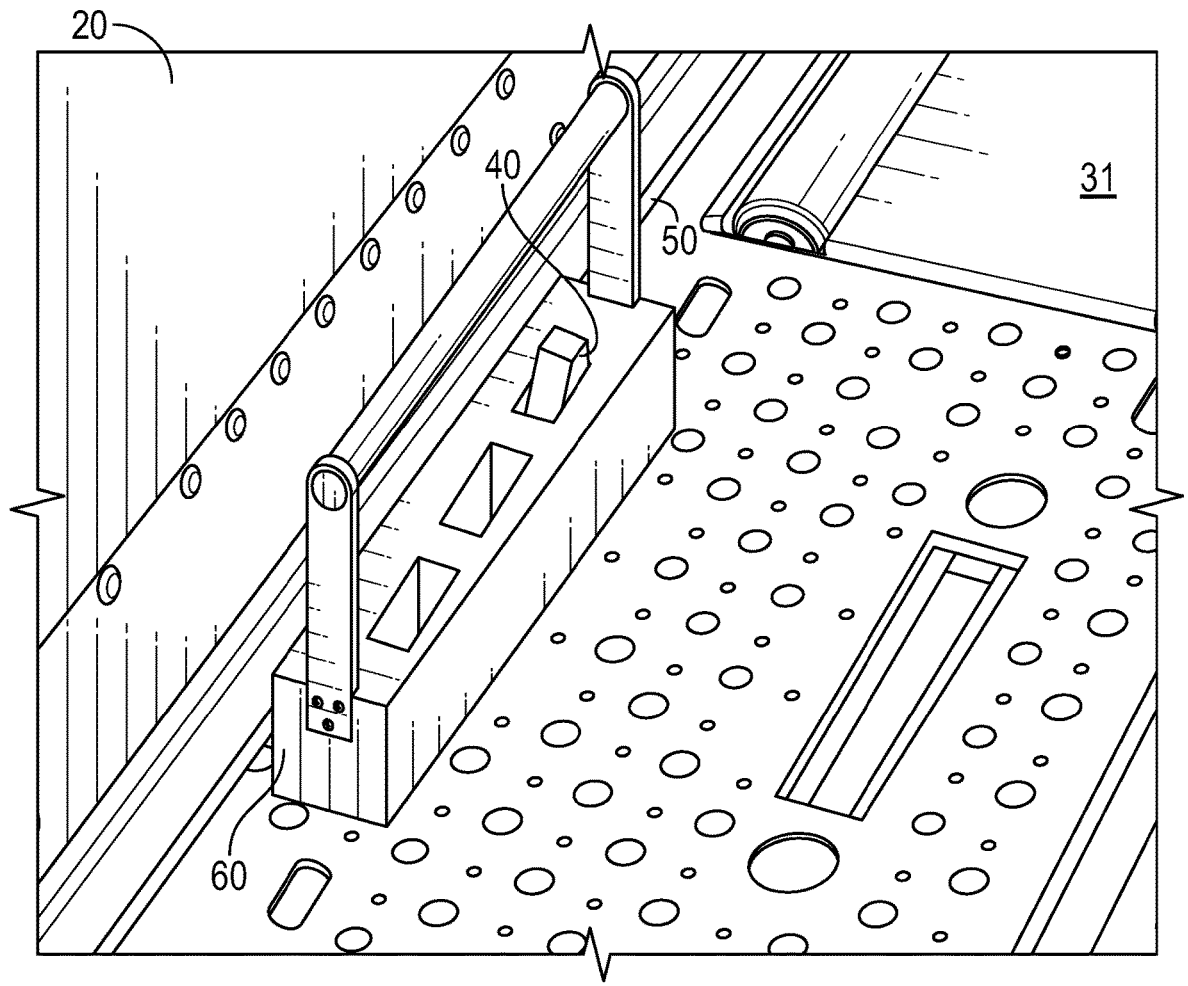
FIG. 2B illustrates an example shim device over the pop-up lock shown in FIG. 2A according to various aspects of the embodiments of the present disclosure.

As described in further detail below with reference to FIG. 2A, that movement can present certain problems and even a safety concern. Thus, according to the concepts described herein, a shim device can be placed over the pop-up lock 40 and between the pop-up lock 40 and the ULD 20. The shim device provides a mechanical interference as a wedge, occupying any limited space that might exist between the bottom edge 50 of the ULD 20 and the pop-up lock 40. Thus, the shim device can prevent the ULD 20 from moving on the roller deck 31 by occupying the limited space between the ULD 20 and the pop-up lock 40. A more detailed view of this mechanical interference is shown in FIG. 2B and described below. An additional shim device can be placed over the pop-up lock 41, if necessary.

FIG. 2A illustrates a closer view of the pop-up lock 40 and the ULD 20. The shape and style of the pop-up lock 40 is representative in FIG. 2A, and other shapes and styles are known in the field. An individual can lift and rotate the pop-up lock 40 out of the channel in the roller decking 31 by extending a finger into the notch at the top of the pop-up lock 40 and rotating it up to the position shown in FIG. 2A. Other styles of pop-up locks can omit the notch shown in FIG. 2A and include a central shoulder with narrowed or tapered end.

As shown in FIG. 2A, a gap "G" can exist between the bottom edge 50 of the ULD 20 and the pop-up lock 40 when the ULD 20 is pushed back as far as possible on the roller decking 31 (i.e., against another mechanical interference on the far side of the ULD 20). The size of the gap "G" can vary by between ½ and 1½ inches, for example, depending on the exact size of the ULD 20, which can vary as compared to other ULDs. The gap "G" thus permits the ULD 20 to shift back and forth to some extent in the direction "D" on the roller decking 31, even when the pop-up lock 40 is used.

If the ULD 20 is being loaded or unloaded by one or more individuals, for example, the shifting weight of the individuals can cause the ULD 20 to shift back and forth, at least to the extent of the size of the gap "G." This movement, although relatively limited, can be problematic for those individuals working to load or unload the ULD 20. The movement can even present a safety concern as the individuals working inside the ULD 20 can be thrown off balance.

FIG. 2B illustrates a shim device 60 over the pop-up lock 40 according to various aspects of the embodiments of the present disclosure. The shim device 60 can be installed over the pop-up lock 40 by an individual as described herein. A shim device similar to the shim device 60 can also be installed over the pop-up lock 41 (FIG. 1) if desired. As shown, the shim device 60 occupies the gap "G," as shown in FIG. 2A, to prevent the ULD 20 from shifting in the direction "D" on the roller decking 31. In other words, the shim device 60 provides a mechanical interference as a wedge between the bottom edge 50 of the ULD 20 and the pop-up lock 40.

The shim device 60 is designed to provide an adjustable mechanical interference. That is, the shim device 60 can offer a number of different sizes of mechanical interferences, depending upon how the shim device 60 is installed over the pop-up lock 40. For example, the shim device 60 includes three apertures or openings as shown in FIG. 2B, each of which is offset from the sides of the shim device 60 by a different distance. Thus, the shim device 60 can provide a different size of mechanical interference between the bottom edge 50 of the ULD 20 and the pop-up lock 40 depending upon how the shim device 60 is installed. The shim device 60 can be installed in a number of different ways depending upon the exact size of the ULD 20 and the gap "G." The shim device 60 is provided as one example in FIG. 2B to introduce the concept and purpose thereof, however, and other types and styles of similar devices are described in further detail below.

Figure 3A:
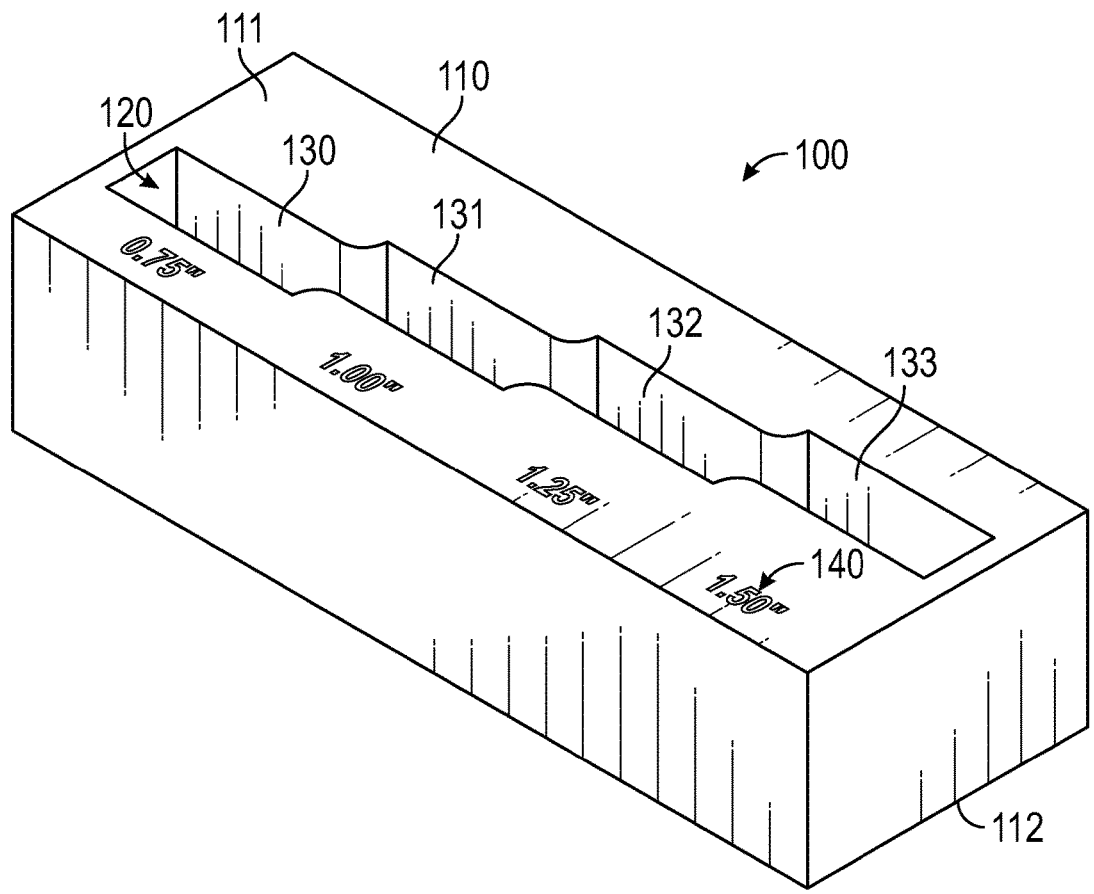
FIG. 3A illustrates a perspective view of an example shim device according to various aspects of the embodiments of the present disclosure.
Figure 3B:
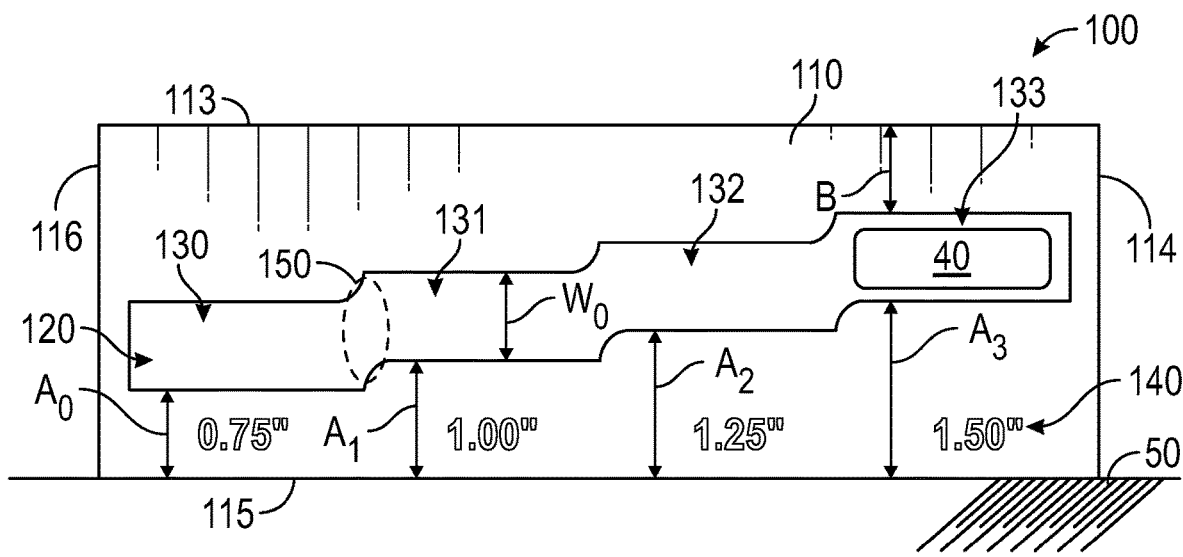
FIG. 3B illustrates a top view of the shim device shown in FIG. 3A according to various aspects of the embodiments of the present disclosure.

A number of different embodiments or examples of shim devices are illustrated in the remaining figures. The illustrations are representative, not drawn to an exact scale, and are not intended to be exhaustive of the concepts described herein. First, FIG. 3A illustrates a perspective view of an example shim device 100 according to one embodiment, and FIG. 3B illustrates a top view of the shim device 100. The shim device 100 includes a shim block 110. Referring to FIG. 3A, the shim block 110 includes an outer top surface 111 and an outer bottom surface 112. Referring to FIG. 3B, the shim block 110 also includes outer side surfaces, including an outer front side surface 113, an outer right side surface 114, outer back side surface 115, and an outer left side surface 116 (collectively, the "outer side surface" or "outer side surfaces"). The shim block 110 also includes an inner aperture 120 that extends through the shim block 110. The inner aperture 120 extends through the shim block 110 to form a top opening in the outer top surface 111 and a bottom opening in the outer bottom surface 112. The width "$W_o$" of the inner aperture 120 can be selected based on the size of the pop-up lock 40. In one example, the width "$W_o$" can range from about ¾ to 1¼ inches, although other dimensions can be relied upon for the width of the inner aperture 120.

In one example, the shim block 110 can be formed as a solid, continuous block of material, with the exception of the inner aperture 120 formed within it. In other cases, the shim block 110 can include some voids or open spaces in addition to the inner aperture 120. The shim block 110 can be formed from any suitable material in any suitable way, such as from wood, plastic, metal, rubber or other materials or combinations thereof, using three-dimensional (3-D) printing, injection molding, or other additive or subtractive manufacturing processes. In one representative example, the shim block 110 can be formed from a suitable plastic material using 3-D printing. The plastic can be of relatively low compressibility (i.e., rigid) to withstand relatively strong forces or weights. The shim block 110 can also be formed from a first rigid material, such as a hard plastic, and coated, covered, or wrapped on one or more sides with a more flexible material, such as rubber. The flexible material can help to protect the shim block 110 from cracking or breaking but is not necessary in all cases. The overall dimensions (e.g., height, width, and length) of the shim block 110 can vary. As one example, the height of the shim block 110 can range from about 1½ to 4 inches, the width of the shim block 110 can range from about 2½ to 4 inches, and the length of the shim block 110 can range from about 6 to 12 inches, but other sizes can be suitable for the purpose.

As shown in FIGS. 3A and 3B, the inner aperture 120 comprises a number of aperture steps 130-133. The steps 130-133 are graduated in spacing from the outer back side surface 115 of the shim block 110 by the material spacings "$A_0$," "$A_1$," "$A_2$," and "$A_3$," respectively. In one example, the distances or lengths of the material spacings "$A_0$," "$A_1$," "$A_2$," and "$A_3$," can be individually marked on the shim block 110. For example, the 1.50 inch marking 140 of the material spacing "$A_3$" can be provided using an indentation, stamp, sticker, or other suitable marking on the outer top surface 111 of the shim block 110. In some embodiments, the inner aperture 120 can also be offset (i.e., not centered) between the outer front side surface 113 and the outer back side surface 115. In other words, the material spacing "B" can be different than the material spacing "$A_0$." Thus, the shim device 60 can be rotated during installation to provide a different set of graduated spacings between the steps 130-133 and the outer back side surface 115 as compared to the steps 130-133 and the outer front side surface 113.

Referring to FIG. 3B, the shim device 60 can be placed or installed over the pop-up lock 40 by an individual or user, with the pop-up lock 40 within the inner aperture 120 at the step 133. As shown, the shim device 60 is placed such that the material spacing "$A_3$" provides a suitable mechanical interference between the pop-up lock 40 and the bottom edge 50 of the base of the ULD 20. In that context, the material spacing "$A_3$" largely occupies all the space between the pop-up lock 40 and the bottom edge 50 of the base of the ULD 20, to keep the ULD 20 from shifting to the extent possible.

During installation of the shim device 60, the pop-up lock 40 can be weaved or shimmied between the steps 130-133 of the inner aperture 120 to the extent necessary to provide the best interference possible for the purpose. For example, the shim device 60 can be placed down with the pop-up lock 40 initially inserted within the step 130 of the inner aperture 120. In that case, however, the material spacing "$A_0$" might not be sufficient to provide enough of an interference between the pop-up lock 40 and the bottom edge 50 of the base of the ULD 20. To provide a larger interference, the user can move or slide the shim device 60 such that the pop-up lock 40 is weaved from the step 130, through the neck 150, and to the step 131. If the material spacing "$A_1$" is not sufficient to provide enough of an interference between the pop-up lock 40 and the bottom edge 50 of the ULD 20, then the user can move or slide the shim device 60 such that the pop-up lock 40 is seated in the step 132. Finally, if the material spacing "$A_2$" is not sufficient, then the user can move or slide the shim device 60 such that the pop-up lock 40 is seated in the step 133 as shown in FIG. 3B. In some cases, it can be necessary to lift, or partially lift, the shim device 60 up as the pop-up lock 40 is being weaved between the steps 130-133. For example, the shim device 60 can be lifted to the extent necessary (e.g., by about 1 inch) for clearance over the bottom edge 50 of the base of the ULD 20. In other cases, if the pop-up lock includes a shoulder and tapered end, lifting the shim device 60 up, at least in part, can help to move the pop-up lock 40 between the steps 130-133.

As noted above, the inner aperture 120 can be offset between the outer front side surface 113 and the outer back side surface 115. Thus, the entire shim device 60 can be rotated 180 degrees around, such that the outer front side surface 113 faces the bottom edge 50 of the base of the ULD 20. The material spacing "B" is different (e.g., by 0.125 inch) than the material spacing "$A_0$," as described above, and the rotation of the shim device 60 provides a different set of mechanical interferences.

Figure 4:
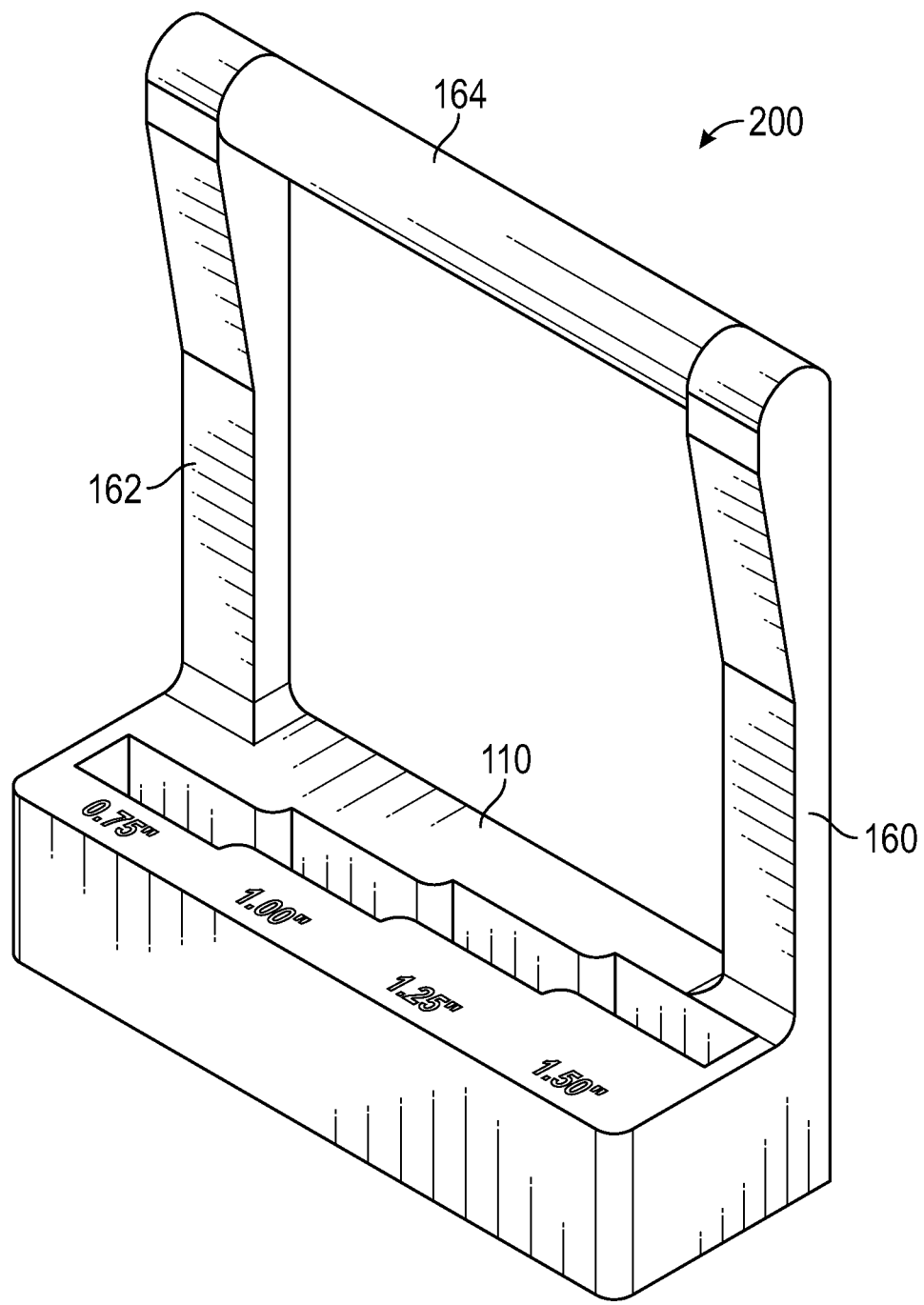
FIG. 4 illustrates a perspective view of another example shim device according to various aspects of the embodiments of the present disclosure.

FIG. 4 illustrates a perspective view of another example shim device 180 according to various aspects of the embodiments of the present disclosure. The shim device 180 includes the shim block 110, as shown in FIGS. 3A and 3B, with a handle. The handle includes handle extension arms 160 and 162 and handlebar 164. The handle extension arms 160 and 162 extend up from two corners of the shim block 110 at one end, as shown in FIG. 4, but can extend up from other locations in other embodiments. The handle extension arms 160 and 162 extend up from the two corners of the shim block 110 so that the handlebar 164 does not obscure the central area of the shim block 110, for installation and adjustment purposes, although the handle extension arms 160 and 162 can extend up from other locations. For example, the handle extension arms 160 and 162 can extend up from the center of the sides of the shim block 110, similar to that shown in FIG. 5A. The handle extension arms 160 and 162 can vary in length, such as from less than about 4 inches to over 1-3 feet or more.

Figure 5A:
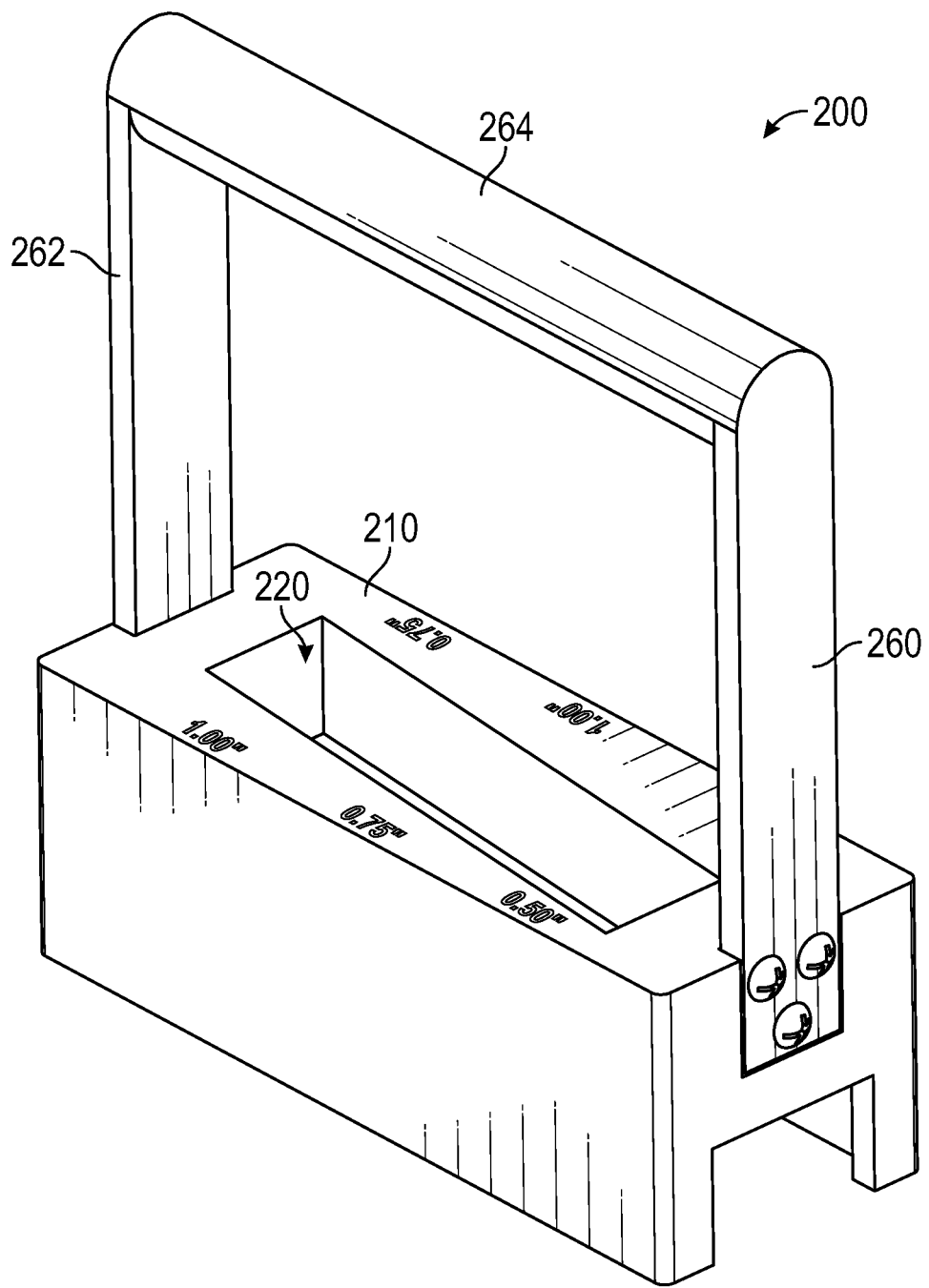
FIG. 5A illustrates a perspective view of another example shim device according to various aspects of the embodiments of the present disclosure.

The handlebar 164 extends between the handle extension arms 160 and 162 at the distal ends of the handle extension arms 160 and 162. The handlebar 164 can be cylindrical in shape as illustrated in FIG. 4, but other shapes can be used. In the example shown in FIG. 4, the handle extension arms 160 and 162 and the handlebar 164 are formed integrally with the shim block 110, which is possible with molding or 3-D printing techniques. In other embodiments, such as shown in FIG. 5A, a handle can be formed separately from and attached to a shim block using screws or other mechanical fasteners. A user can hold the handlebar 164 to position and reposition the shim device 180 over pop-up locks, with less need to bend over or kneel down.

FIG. 5A illustrates a perspective view of another example shim device 200 according to various aspects of the embodiments of the present disclosure. The shim device 200 includes a shim block 210 having an inner aperture 220 and a handle. The handle includes handle extension arms 260 and 262 and handlebar 264. The handle extension arms 260 and 262 are secured to and extend up from the sides of the shim block 210, as shown in FIG. 5A, but can extend up from other locations in other embodiments. The handle extension arms 260 and 262 can vary in length, such as from less than about 4 inches to over 1-3 feet or more.

The shim block 210 can be formed as a solid, continuous block of material, with the exception of the inner aperture 220 and an inner cavity formed within it, as described below. Similar to the shim block 110, the shim block 210 can be formed from any suitable material in any suitable way, such as from wood, plastic, metal, rubber or other materials or combinations thereof, using three-dimensional (3-D) printing, injection molding, or other additive or subtractive manufacturing processes. The plastic can be of relatively low compressibility (i.e., rigid) to withstand relatively strong forces or weights. The shim block 210 can also be formed from a first rigid material, such as a hard plastic, and coated, covered, or wrapped on one or more sides with a more flexible material, such as rubber. The overall dimensions (e.g., height, width, and length) of the shim block 210 can vary. As one example, the height of the shim block 210 can range from about 1½ to 4 inches, the width of the shim block 210 can range from about 2½ to 4 inches, and the length of the shim block 210 can range from about 6 to 12 inches, but other sizes can be suitable for the purpose.

As compared to the shim device 100 illustrated in FIGS. 3A and 3B, the aperture 220 of the shim device 200 does not include the steps 130-133. Instead, the aperture 220 of the shim device 200 extends in a straight path, at an angle, within the shim block 210, without any graduated steps. The design aspects and use of the shim device 200 are described in further detail below with reference to FIGS. 5B and 5C.

Figure 5B:
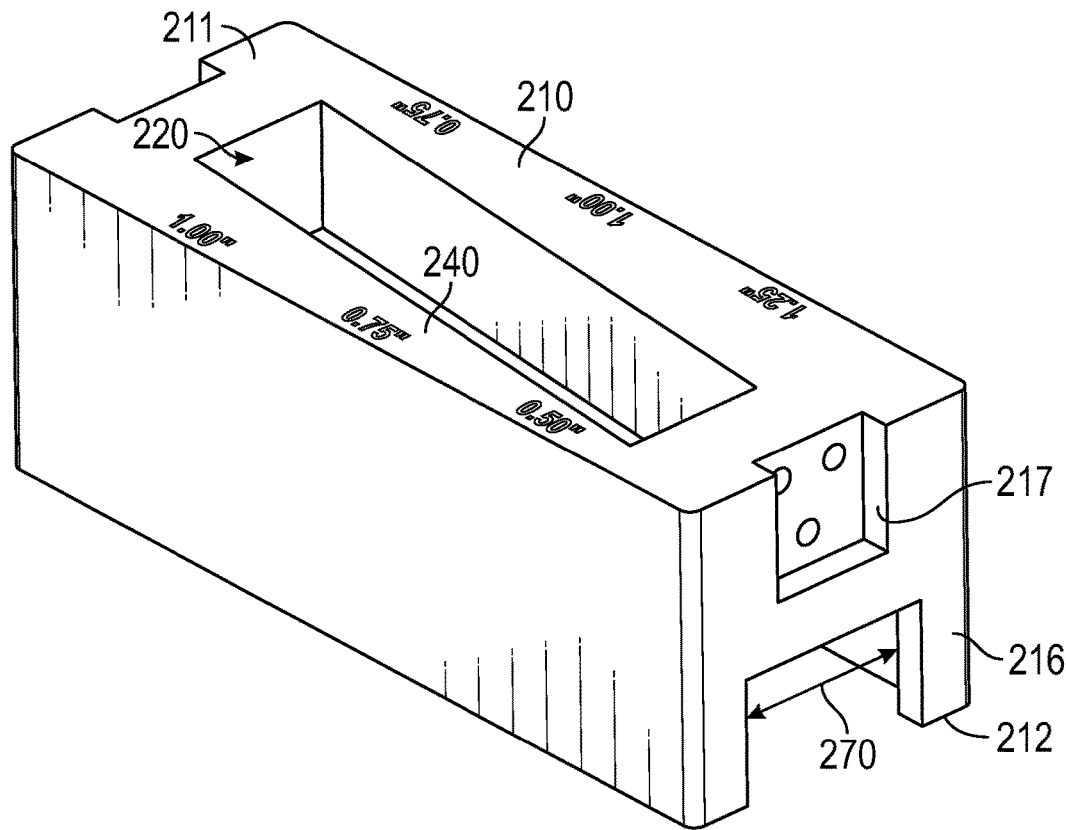
FIG. 5B illustrates another perspective view of the shim device shown in FIG. 5A according to various aspects of the embodiments of the present disclosure.
Figure 5C:
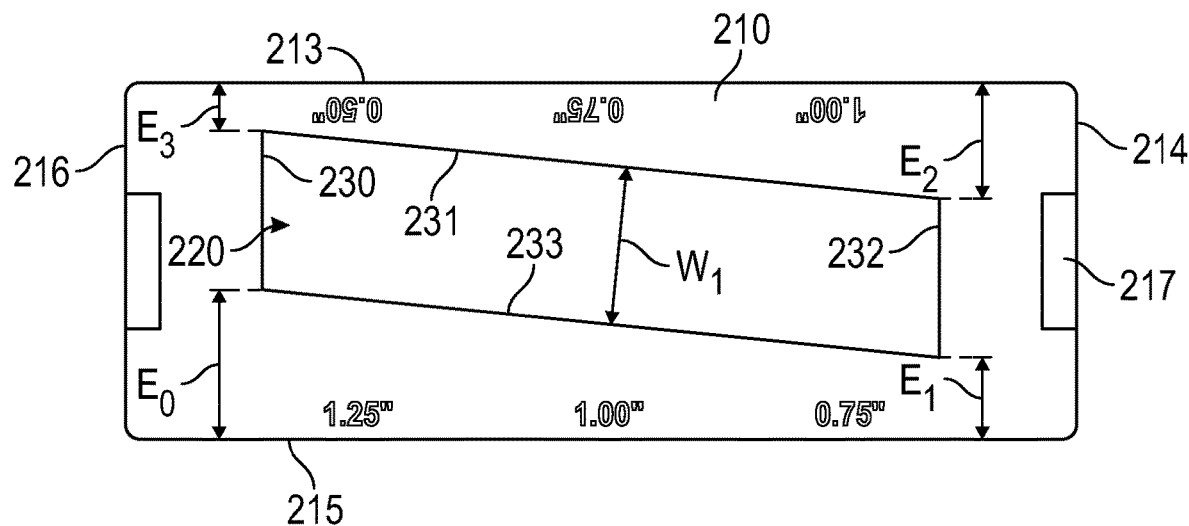
FIG. 5C illustrates a top view of the shim device shown in FIG. 5A according to various aspects of the embodiments of the present disclosure.

FIG. 5B illustrates another perspective view of the shim block 210 of the shim device 200 shown in FIG. 5A, and FIG. 5C illustrates a top view of the shim block 210. In both FIGS. 5B and 5C, the handle of the shim device 200 has been omitted from view so as not to obscure certain features of the shim block 210. A handle cutout ridge 217 is referenced on one side of the shim block 210 in FIGS. 5A and 5B, and the shim block 210 includes a similar handle cutout ridge on the other side of the shim block 210. Referring to FIG. 5B, the shim block 210 includes an outer top surface 211, an outer bottom surface 212. Referring to FIG. 5C, the shim block 210 also includes outer side surfaces, including an outer front side surface 213, an outer right side surface 214, an outer back side surface 215, and an outer left side surface 216. The shim block 210 also includes a cutout 270 in the outer left side surface 216, as shown in FIG. 5B, and a similar cutout in the outer right side surface 214.

The shim block 210 also includes an inner aperture 220 that extends through the shim block 210. The inner aperture 220 extends through the shim block 210 to form a top opening in the outer top surface 211. As described in further detail below with reference to FIG. 5D, the inner aperture 220 also expands or opens into an inner cavity 250 within the shim block 210. The width "$W_1$" of the inner aperture 220 can be selected based on the typical size of pop-up locks and can vary from that shown in FIG. 5C. In one example, the width "$W_1$" can range from about ¾ to 1¼ inches, although other dimensions can be relied upon for the width of the inner aperture 220.

As shown in FIGS. 5B and 5C, the shim block 210 comprises an inner surface within the shim block 210 that surrounds the inner aperture 220. The inner surface comprises an inner left side surface 230, an inner front side surface 231, an inner right side surface 232, and an inner back side surface 233. The inner aperture 220 extends at an angle within the shim block 210, as best shown in FIG. 5C. Because the inner aperture 220 extends at an angle, it provides continuous variation in the range of mechanical interference provided by the shim block 210. Particularly, a corner at the inner left side surface 230 and the inner back side surface 233 is offset by the material distance "$E_0$" from the outer back side surface 215. A corner at the inner right side surface 232 and the inner back side surface 233 is offset by the material distance "$E_1$" from the outer back side surface 215. The material distance "$E_0$" is different than the material distance "$E_1$." In the example shown in FIG. 5C, the material distance "$E_0$" is greater than the material distance "$E_1$," such that the inner aperture 220 extends at an angle within the shim block 210.

The distances or lengths of the material spacings "$E_0$," "$E_1$," "$E_2$," and "$E_3$," can be individually marked on the shim block 110. For example, the 0.75 inch marking 240 of the material spacing "$E_1$" can be provided using an indentation, stamp, sticker, or other suitable marking on the outer top surface 111 of the shim block 110 as shown in FIG. 5B. Additionally, in some embodiments, the inner aperture 220 can also be offset (i.e., not centered) between the outer front side surface 213 and the outer back side surface 215. In other words, the material spacing "$E_3$" is different than the material spacing "$E_1$." Thus, the shim device 200 can be rotated during installation to provide a different range of mechanical interference between the inner aperture 220 and the outer front side surface 213 as compared to the inner aperture 220 and the outer back side surface 215.

The shim device 200 can be placed or installed over a pop-up lock, such as the pop-up lock 40 shown in FIGS. 1 and 2A, by an individual or user. The shim device 200 can be installed with either the outer front side surface 213 or the outer back side surface 215 of the shim device 200 facing (and potentially contacting) the bottom base edge of a ULD. The shim device 200 can also be moved to the right or left (to the extent possible), and the pop-up lock can then slide within the inner aperture 220. The shim device 200 can be moved to the right or left until it mechanically interferes with the ULD as a type of wedge between the pop-up lock and the ULD.

Figure 5D:
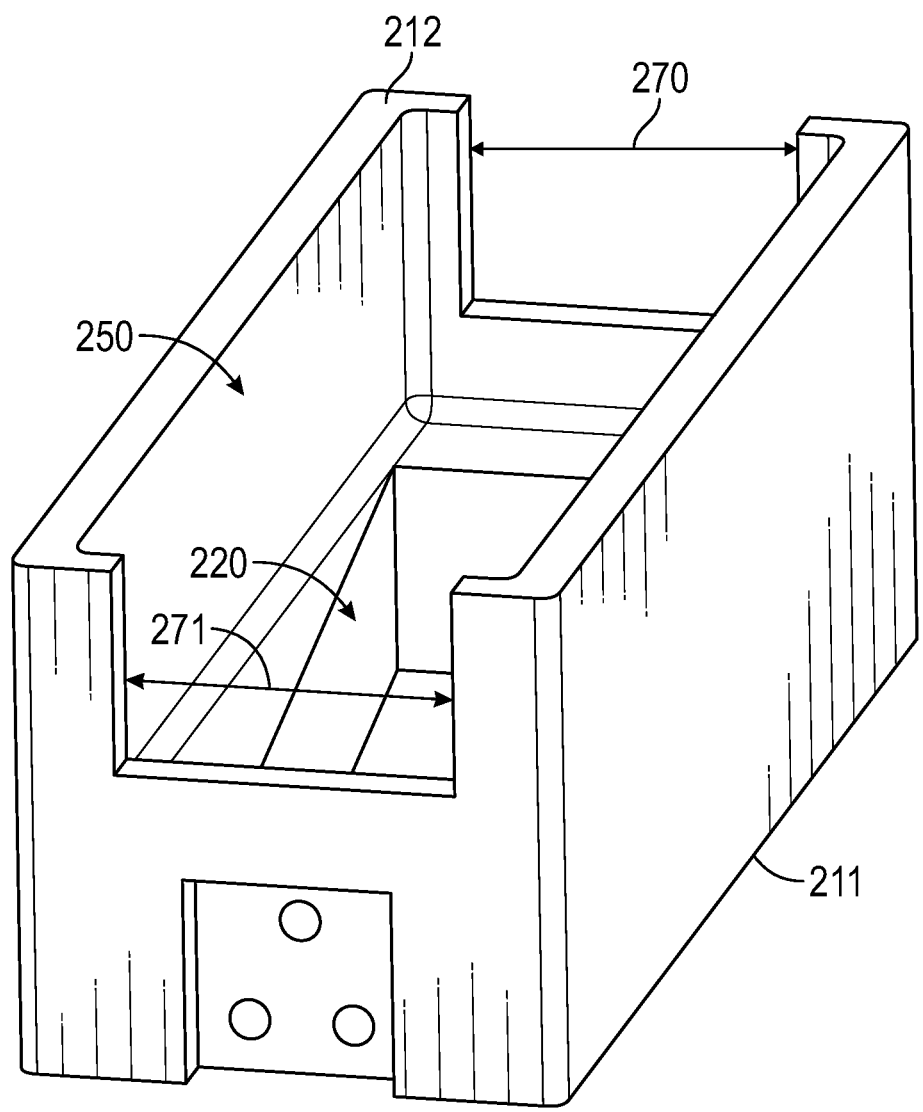
FIG. 5D illustrates a bottom perspective view of the shim device shown in FIG. 5A according to various aspects of the embodiments of the present disclosure.

FIG. 5D illustrates a bottom perspective view of the shim block 210 shown in FIGS. 5A-5C. As shown, the inner aperture 220 opens up into the inner cavity 250 within the shim block 210. The inner cavity 250 can provide clearance for certain shapes and styles of pop-up locks, such as a pop-up lock having a shoulder and tapered end, particularly for installation and adjustment of the shim block 210. The shim block 210 also includes a cutout 270 in the outer left side surface 216, and a similar cutout 271 in the outer right side surface 214. The cutouts 270 and 271 can also provide additional clearance for placement of the shim block 210 over a pop-up lock, particularly if the pop-up lock contacts the inner left side surface 230 (FIG. 5C) or the inner right side surface 232 (FIG. 5C) of the inner aperture 220.

Figure 6A:
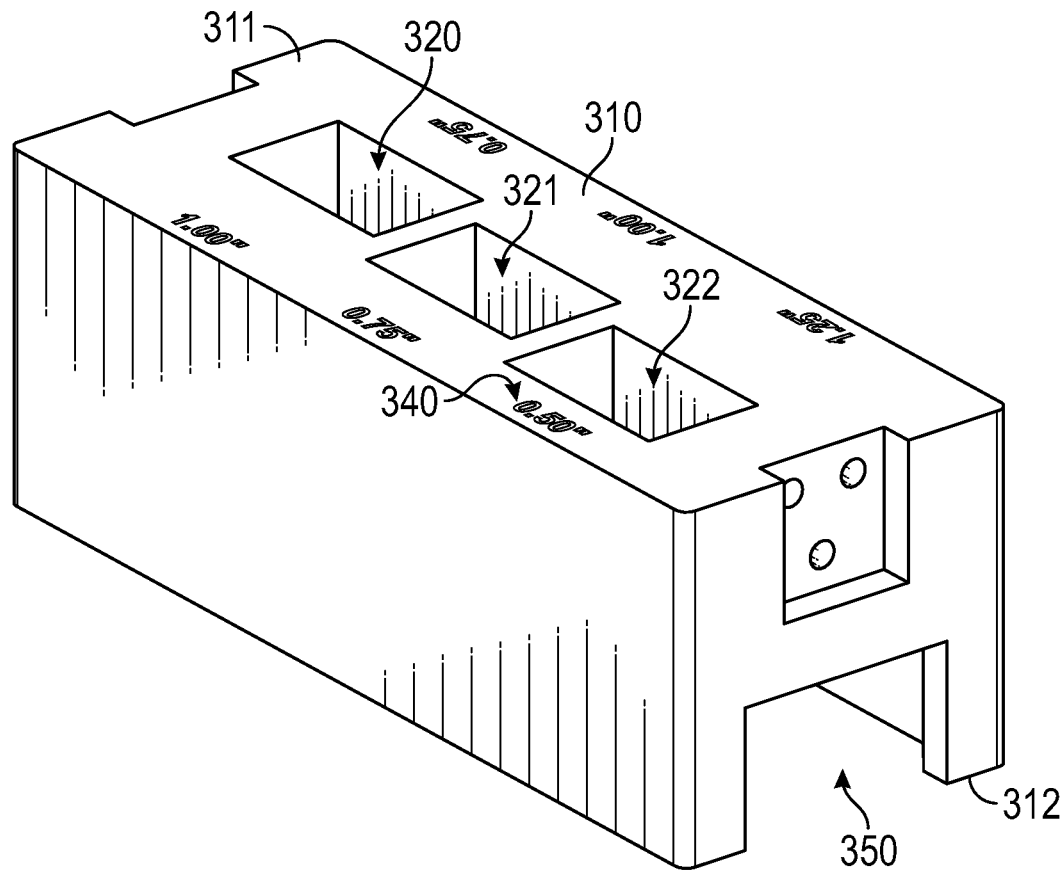
FIG. 6A illustrates a perspective view of another example shim block according to various aspects of the embodiments of the present disclosure.
Figure 6B:
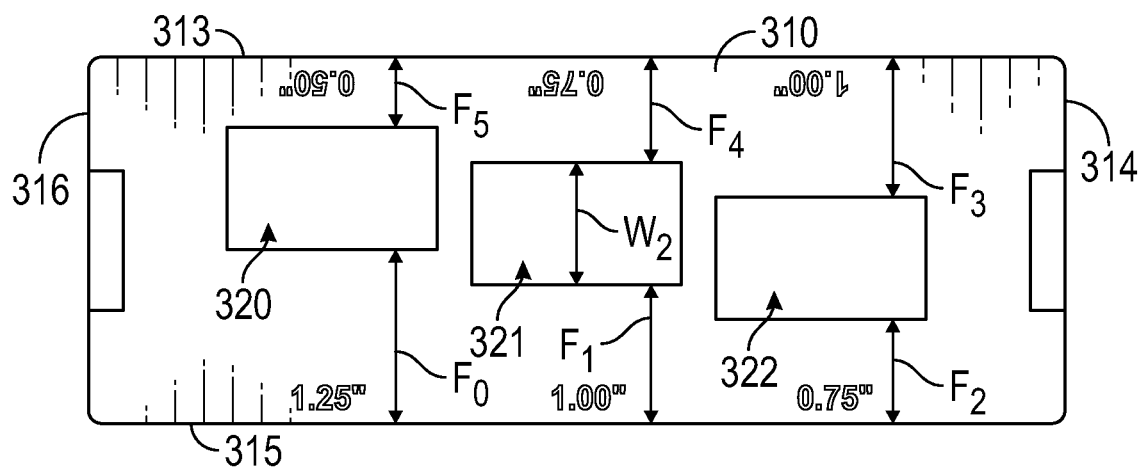
FIG. 6B illustrates a top view of the shim block shown in FIG. 6A according to various aspects of the embodiments of the present disclosure.

FIG. 6A illustrates a perspective view of another example shim block 310, and FIG. 6B illustrates a top view of the shim block 310 shown in FIG. 6A according to various aspects of the embodiments of the present disclosure. The shim block 310 can be used with a handle, similar to that shown in FIG. 5A, although the handle is omitted from view in FIGS. 6A and 6B.

Referring to FIG. 6A, the shim block 310 includes an outer top surface 311 and an outer bottom surface 312. Referring to FIG. 6B, the shim block 310 also includes outer side surfaces, including an outer front side surface 313, an outer right side surface 314, outer back side surface 315, and an outer left side surface 316. Referring between FIGS. 6A and 6B, the shim block 310 also includes a number of inner apertures 320-322 that extend through the shim block 310. The inner apertures 320-322 extend through the shim block 310 to form a number of top openings in the outer top surface 311. The inner apertures 320-322 also expand or open into the inner cavity 350 within the shim block 310. The widths "$W_2$" of the inner apertures 320-322 can be selected based on the typical size of pop-up locks and can vary from that shown in FIG. 6B. In one example, the width "$W_2$" can range from about ¾ to 1¼ inches, although other dimensions can be relied upon for the width of the inner aperture 220.

The shim block 310 can be formed as a solid, continuous block of material, with the exception of the inner apertures 320-322 and the inner cavity 350 formed within it. The shim block 310 can be formed from any suitable material in any suitable way, such as from wood, plastic, metal, rubber or other materials or combinations thereof, using 3-D printing, injection molding, or other additive or subtractive manufacturing processes. The shim block 310 can also be formed from a first rigid material, such as a hard plastic, and coated, covered, or wrapped on one or more sides with a more flexible material, such as rubber. The overall dimensions (e.g., height, width, and length) of the shim block 310 can vary. As one example, the height of the shim block 110 can range from about 1½ to 4 inches, the width of athe shim block 310 can range from about 2½ to 4 inches, and the length of the shim block 310 can range from about 6 to 12 inches, but other sizes can be suitable for the purpose.

As shown in FIGS. 6A and 6B, the inner apertures 320-322 are graduated in spacing from the outer back side surface 315 of the shim block 310 by the material spacings "$F_0$," "$F_1$," and "$F_2$," respectively. The inner apertures 320-322 are also graduated in spacing from the outer front side surface 313 of the shim block 310 by the material spacings "$F_5$," "$F_4$," and "$F_3$," respectively. The distances or lengths of the material spacings "$F_0$," "$F_1$," "$F_2$," "$F_3$," "$F_4$," and "$F_5$" can be individually marked on the shim block 310. For example, the marking 340 of the material spacing "$F_5$" can be provided using an indentation, stamp, sticker, or other suitable marking on the outer top surface 111 of the shim block 110. Alternatively, the inner apertures 320-322 can be arranged in a row (i.e., with the spacings "$F_0$," "$F_1$," and "$F_2$," being the same), and the widths of each of the inner apertures 320-322 can vary as compared to each other. For example, the width of the inner aperture 320 can be the smallest, at about ¾ inch, the width of the inner aperture 321 can be about 1 inch, and the width of the inner aperture 322 can be the largest, at about 1¼ inches. The shim block 310 could then be used with pop-up locks of different widths or sizes.

The inner apertures 320-322 can also be offset (i.e., not centered) between the outer front side surface 313 and the outer back side surface 315. In other words, the material spacing "$F_0$" can be different than the material spacing "$F_5$." Thus, the shim block 310 can be rotated during installation to provide a different set of graduated spacings between the inner apertures 320-322 and the outer back side surface 315 as compared to the inner apertures 320-322 and the outer front side surface 313.

The shim block 310 can be placed or installed over a pop-up lock, similar to the pop-up lock 40 shown in FIGS. 1 and 2A, by an individual or user. The shim block 310 can be installed with either the outer front side surface 313 or the outer back side surface 315 of the shim block 310 facing the bottom base edge of a ULD. The shim block 310 can be installed with the pop-up lock inserted into one of the inner apertures 320-322. If needed, the shim block 310 can be moved to the right or left, repositioning the pop-up lock into another one of the inner apertures 320-322, until it mechanically interferes with the ULD as a type of wedge between the pop-up lock and the ULD.

Figure 7:
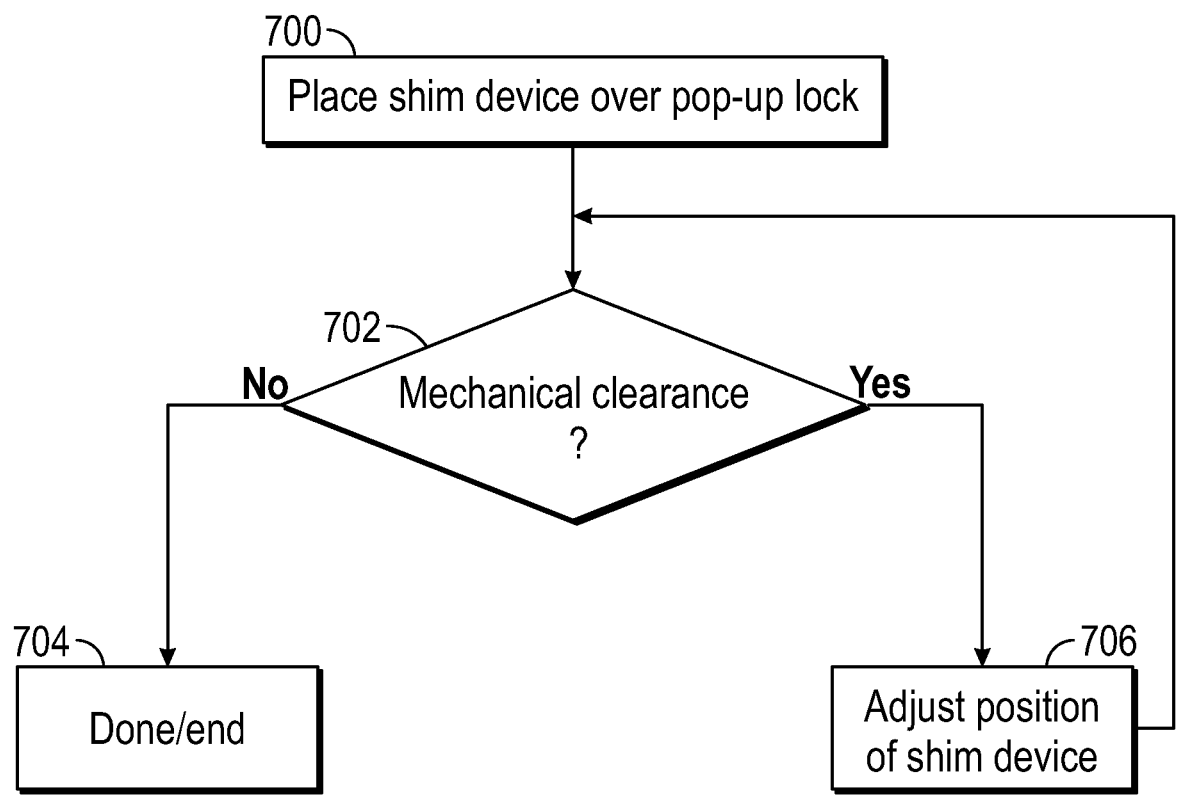
FIG. 7 illustrates a method of securing a unit load device according to various aspects of the embodiments of the present disclosure.

FIG. 7 illustrates a method of securing a ULD according to various aspects of the embodiments of the present disclosure. The process shown in FIG. 7 is described in connection with the example shim devices and shim blocks described herein, although other, related shim devices and shim blocks can be used in the method. Although the process diagram shows an order of certain steps, the order can differ from that which is shown. For example, the order of two or more steps can be switched relative to the order shown or as described below. Also, two or more steps shown in succession can be performed at the same time or with partial concurrence. Additionally, although the method is described as being performed by an individual or user, automated systems, such as robotic systems, can perform the method.

At step 700, the method includes placing a shim device or shim block over a pop-up lock and between the pop-up lock and a unit load device on decking. Here, any of the shim devices or blocks described herein, such as the shim device 100 shown in FIGS. 3A and 3B, the shim device 180 shown in FIG. 4, the shim device 200 shown in FIGS. 5A-5D, or the shim block shown in FIGS. 6A and 6B, among others, can be placed over a pop-up lock similar to the pop-up lock 40 shown in FIG. 2A. The shim device can be placed by an individual or other automated system.

At step 702, the method includes examining the ULD and the shim device for mechanical clearance between the ULD and the shim device. The examining at step 702 can include a visual examination, a physical examination, or both a visual and a physical examination. For example, an individual can look to see if any space exists between the ULD and the shim device. Additionally or alternatively, the individual can attempt to move or adjust the ULD and/or the shim device. If either the ULD or the shim device moves, a mechanical clearance still exists between the ULD and the shim device. If no mechanical clearance is identified at step 702, the method can end at step 704.

If a mechanical clearance is identified at step 702, the method can proceed to step 706. At step 706, the method includes adjusting a position of the shim device based on the mechanical clearance. Here, the individual can adjust the placement of the shim device to create the desired level of mechanical interference between the ULD and the shim device. The adjustment at step 702 can vary depending upon the type or style of the shim device being used, and any manner of adjustment described herein can be relied upon. For example, the pop-up lock can be weaved or shimmied between the steps 130-133 of the shim device 100 shown in FIG. 3B, slid within the aperture 220 of the shim device 200 shown in FIG. 5A, or moved between the inner apertures 320-322 of the shim block 310 shown in FIG. 6A. Steps 706 and 702 can be conducted, in turn, until a desired amount of mechanical interference has been obtained between the ULD and the shim device.

Although embodiments have been described herein in detail, the descriptions are by way of example. In other words, the embodiments of the frame described herein are not limited to frame structures for aircraft, however, and may be relied upon as frame structures for both airborne and ground-based crafts, vehicles, etc. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures. Therefore, the following is claimed:

1. A system for securing a unit load device, comprising:
   a pop-up lock in decking for transporting a unit load device; and a shim device for placement over the pop-up lock to provide a mechanical interference, the shim device comprising:
  a shim block, the shim block comprising an outer top surface, an outer bottom surface, an outer side surface, and a plurality of inner apertures that extend through the shim block and form at least one top opening in the outer top surface and at least one bottom opening in the outer bottom surface; and
  a handle connected with and extending from the shim block, wherein:
  the shim block can be placed over the pop-up lock, with the pop-up lock extending into at least one of the plurality of inner apertures, to provide a mechanical interference between the unit load device and the pop-up lock.

2. The system according to claim 1, wherein the plurality of inner apertures are graduated in spacing, respectively, from the outer side surface of the shim block by different distances.

3. The system according to claim 1, wherein:
the shim block further comprises an inner cavity; and
the at least one of the plurality of inner apertures opens up into the inner cavity within the shim block.

4. A system for securing a unit load device, comprising:
a pop-up lock in decking for transporting a unit load device; and
a shim device for placement over the pop-up lock to provide a mechanical interference, the shim device comprising:
  a shim block, the shim block comprising an outer top surface, an outer bottom surface, an outer side surface, and at least one inner aperture that extends through the shim block and forms at least one top opening in the outer top surface and at least one bottom opening in the outer bottom surface; and
  a handle connected with and extending from the shim block, wherein:
  the shim block can be placed over the pop-up lock, with the pop-up lock extending into the at least one inner aperture, to provide a mechanical interference between the unit load device and the pop-up lock; and
  the at least one inner aperture comprises a plurality of aperture steps; and
  the plurality of aperture steps are graduated in spacing from the outer side surface of the shim block.

5. The system according to claim 4, wherein:
the shim block further comprises an inner cavity; and
the at least one inner aperture opens up into the inner cavity within the shim block.

6. A shim device, comprising:
a shim block, the shim block comprising an outer top surface, an outer bottom surface, an outer side surface, and a plurality of inner apertures that extend through the shim block, wherein:
the plurality of inner apertures extend through the shim block to form at least one top opening in the outer top surface and a bottom opening in the outer bottom surface.

7. The shim device according to claim 6, further comprising a handle connected with and extending from the shim block.

8. The shim device according to claim 6, wherein the plurality of inner apertures are graduated in spacing, respectively, from the outer side surface of the shim block by different distances.

9. The shim device according to claim 6, wherein:
the outer side surface comprises an outer front side surface and an outer back side surface; and
the plurality of inner apertures are graduated in spacing, respectively, from the outer back side surface of the shim block by different distances than the plurality of inner apertures are graduated in spacing, respectively, from the outer front side surface.

10. The shim device according to claim 6, wherein the shim block can be placed over a pop-up lock in decking, with the pop-up lock extending into at least one of the plurality of inner apertures, to provide a mechanical interference between a unit load device and the pop-up lock.

11. The shim device according to claim 6, wherein the shim block can be placed over a pop-up lock in decking, with the pop-up lock extending into at least one of the plurality of inner apertures, to provide a mechanical interference between a unit load device and the pop-up lock with contact between an outer front side surface of the shim block and the unit load device and between an inner surface of the at least one of the plurality of inner apertures and the pop-up lock.

12. The shim device according to claim 6, wherein:
the shim block further comprises an inner cavity; and
at least one of the plurality of inner apertures opens up into the inner cavity within the shim block.

13. A shim device, comprising:
a shim block, the shim block comprising an outer top surface, an outer bottom surface, an outer side surface, and at least one inner aperture that extends through the shim block, wherein:
the at least one inner aperture extends through the shim block to form a top opening in the outer top surface and a bottom opening in the outer bottom surface; and
the at least one inner aperture comprises a plurality of aperture steps.

14. The shim device according to claim 13, wherein the plurality of aperture steps are graduated in spacing from the outer side surface of the shim block.

15. The shim device according to claim 13, wherein:
the shim block further comprises an inner cavity; and
the at least one inner aperture opens up into the inner cavity within the shim block.

16. A shim device, comprising:
a shim block, the shim block comprising an outer top surface, an outer bottom surface, an outer side surface, and at least one inner aperture that extends through the shim block, wherein:
the at least one inner aperture extends through the shim block to form a top opening in the outer top surface and a bottom opening in the outer bottom surface, wherein:
  the shim block further comprises an inner surface within the shim block that surrounds the at least one inner aperture;
  the inner surface comprises an inner right side surface, an inner left side surface, an inner front side surface, and an inner back side surface; and
  a corner at the inner right side surface and the inner back side surface is offset from the outer side surface of the shim block by a different distance than a corner of the inner left side surface and the inner back side surface of the shim block, such that the at least one inner aperture extends at an angle within the shim block.

17. The shim device according to claim 16, wherein:
the shim block further comprises an inner cavity; and the at least one inner aperture opens up into the inner cavity within the shim block.

18. A method of securing a unit load device, comprising:
placing a shim device over a pop-up lock and between the pop-up lock and a unit load device on decking;
examining the unit load device and the shim device for mechanical clearance between the unit load device and the shim device; and
adjusting a position of the shim device based on the mechanical clearance, wherein the shim device comprises:
   a shim block, the shim block comprising an outer top surface, an outer bottom surface, an outer side surface, and a plurality of inner apertures that extend through the shim block and form at least one top opening in the outer top surface and at least one bottom opening in the outer bottom surface.

19. The method according to claim 18, wherein the plurality of inner apertures are graduated in spacing, respectively, from the outer side surface of the shim block by different distances.

20. The method according to claim 18, wherein:
the plurality of inner apertures comprise a plurality of aperture steps; and
the plurality of aperture steps are graduated in spacing from the outer side surface of the shim block.

* * * * *